United States Patent [19]
Deane

[11] 3,802,162
[45] Apr. 9, 1974

[54] AIR CLEANER

[75] Inventor: Clifford T. Deane, South Charleston, W. Va.

[73] Assignee: Vortex Air Corporation, Dunbar, W. Va.

[22] Filed: Apr. 17, 1973

[21] Appl. No.: 351,846

[52] U.S. Cl............ 55/230, 55/238, 55/396, 55/406, 261/90, 261/DIG. 54
[51] Int. Cl............................................. B01d 47/10
[58] Field of Search................. 55/230–231, 55/237–238, 257, 392, 394, 396, 397, 413–414, 317, 319, 400–403, 406; 261/89–90, DIG. 54

[56] References Cited
UNITED STATES PATENTS

| 879,219 | 2/1908 | Towns | 55/230 |
| 1,548,066 | 9/1925 | Steinbart | 55/396 X |
| 2,195,707 | 4/1940 | Nutting | 55/237 X |
| 2,396,526 | 3/1946 | Nilsson | 55/231 X |
| 2,968,360 | 1/1961 | Goldsmith | 55/317 X |
| 3,048,956 | 8/1962 | Lundy et al. | 261/DIG. 54 |
| 3,191,364 | 6/1965 | Sylvan | 55/401 X |
| 3,216,182 | 11/1965 | Cochran et al. | 55/396 X |
| 3,406,499 | 10/1968 | Wiemer | 55/238 X |
| 3,548,568 | 12/1970 | Carlson et al. | 55/401 X |
| 3,693,326 | 9/1972 | Deane | 55/230 |

FOREIGN PATENTS OR APPLICATIONS

| 13,930 | 0/1914 | Great Britain | 55/401 |
| 698,319 | 11/1940 | Germany | 55/403 |
| 895,669 | 5/1962 | Great Britain | 55/237 |

Primary Examiner—Tim R. Miles
Assistant Examiner—Vincent Gifford
Attorney, Agent, or Firm—Clarence A. O'Brien; Harvey B. Jacobson

[57] ABSTRACT

Dust-laden air into which water is sprayed, is drawn through a two stage impeller assembly to impart vortical movement to the air mass in an axial flow stream causing centrifugal separation of the more dense components from a radially inner portion of the flow stream that is discharged. A venturi tube section accelerates axial flow between the impeller stages. The separated contaminants in the air are collected as a slurry, from annular spaces into which the slurry enters through baffle flow paths.

8 Claims, 4 Drawing Figures

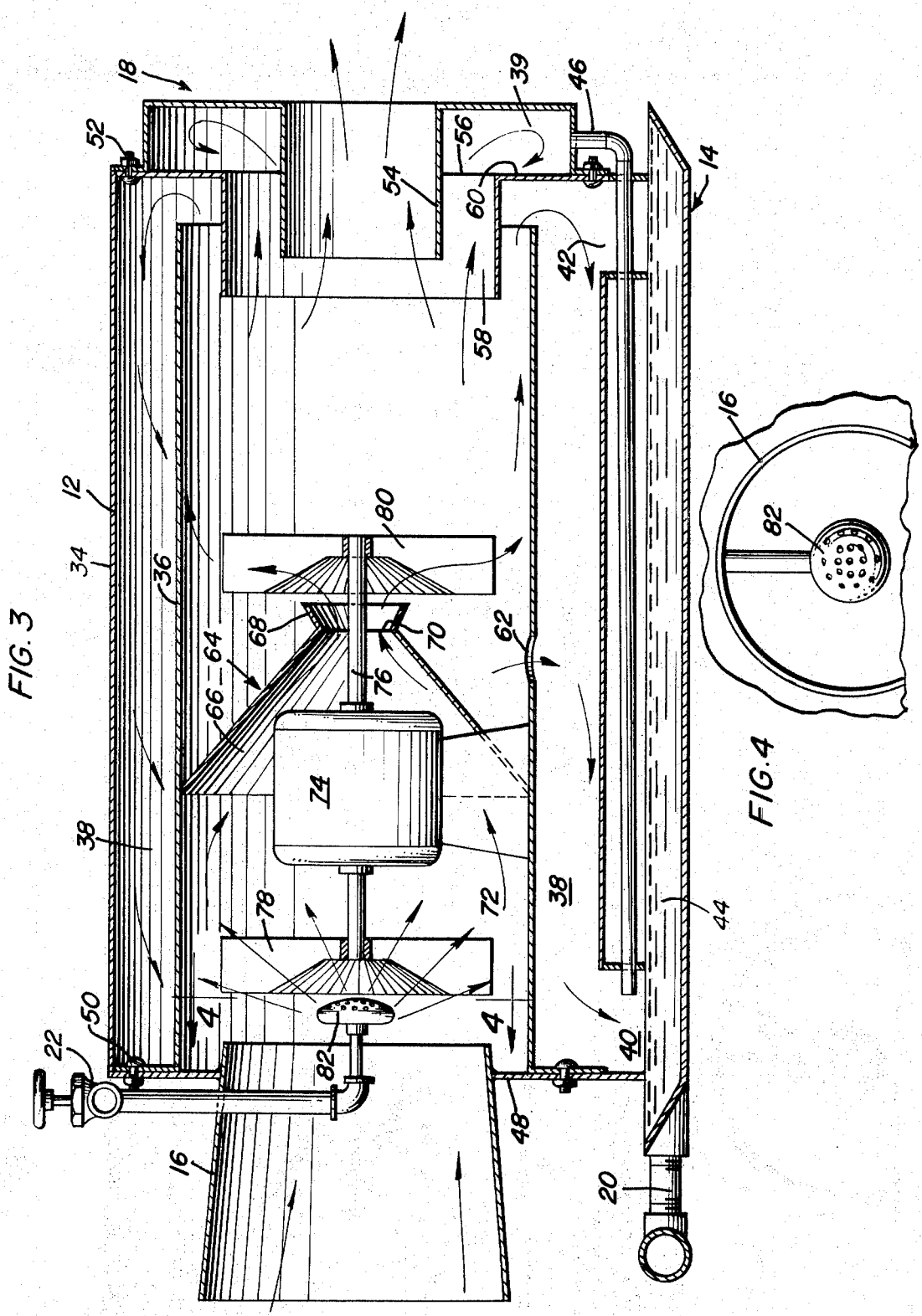

AIR CLEANER

This invention relates to air pollution control and more particularly to the removal of contaminants such as vapors, mists, dust, fumes and smoke from air.

In many industrial installations, air cleaning equipment is required to remove solid and liquid particles from the air enclosed in buildings in which various industrial processes are being performed. This involves the expenditure of fuel for operation of the equipment and time and labor to frequently clean and service the equipment such as replacement or cleaning of bags or filters. Also, such air cleaning equipment is associated with large and bulky duct work involving a considerable installational expense.

It is therefore an important object of the present invention to provide an air cleaner that requires no duct work, and has no bags or filters that must be replaced or cleaned.

A further object is to provide an air cleaner through which air is conducted and contaminants rapidly and efficiently removed for easy disposal in the form of a slurry.

In accordance with the present invention polluted or dust laden air is conducted successively through at least two axially spaced stages of an impeller assembly which produces vortical flow so as to centrifugally induce separation of a more dense concentration of solid and liquid contaminants from a concentration of less dense cleaner air. Axial flow between impeller stages is accelerated by a venturi flow section while injection of a water spray enhances the separation process and produces a slurry of the contaminants that is baffled and collected from radially outer spaces surrounding the vortical flow passage within which the separation process occurs.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a side sectional view taken substantially through a plane indicated by section line 3—3 in FIG. 2.

FIG. 4 is a partial transverse sectional view taken substantially through a plane indicated by section line 4—4 in FIG. 3.

Figure 1:
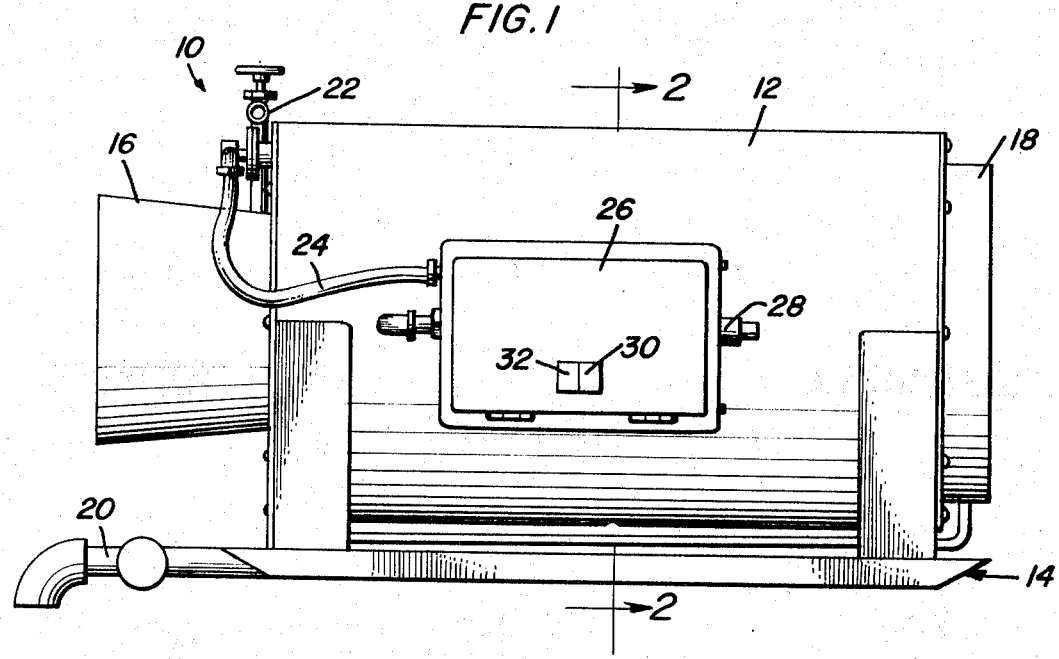
FIG. 1 is a side elevational view of an air cleaner constructed in accordance with the present invention.

Referring now to the drawings in detail, FIG. 1 illustrates a typical air cleaner 10 constructed in accordance with the present invention. The air cleaner 10 includes a cylindrical housing generally referred to by reference numeral 12 supported on a floor or platform by a suitable base assembly 14 with its longitudinal axis generally in a horizontal position. A conical inlet section 16 is connected to one axial end of the housing while an outlet cap section 18 is connected to the opposite axial end. Dust laden air is drawn into the air cleaner through the inlet section and clean air is discharged from the outlet section. The dust removed from the air is carried off in a slurry through a discharge conduit 20. The water with which the dust is mixed to form the slurry is supplied to the housing through an inlet fitting 22 mounted in the inlet section. A water supply hose 24 is connected to the fitting and a control box 26 to which a source of water under pressure is connected through fitting 28. The control box which is mounted on the side of the housing encloses electrical controls for starting and stopping operation of the air cleaner. Start and stop push-button switches 30 and 32 are therefore mounted on the control box panel. As will be explained hereafter operation of the air cleaner is effected by energization of a drive motor and opening of a solenoid operated valve (not shown) to admit water to the hose 24.

Figure 2:
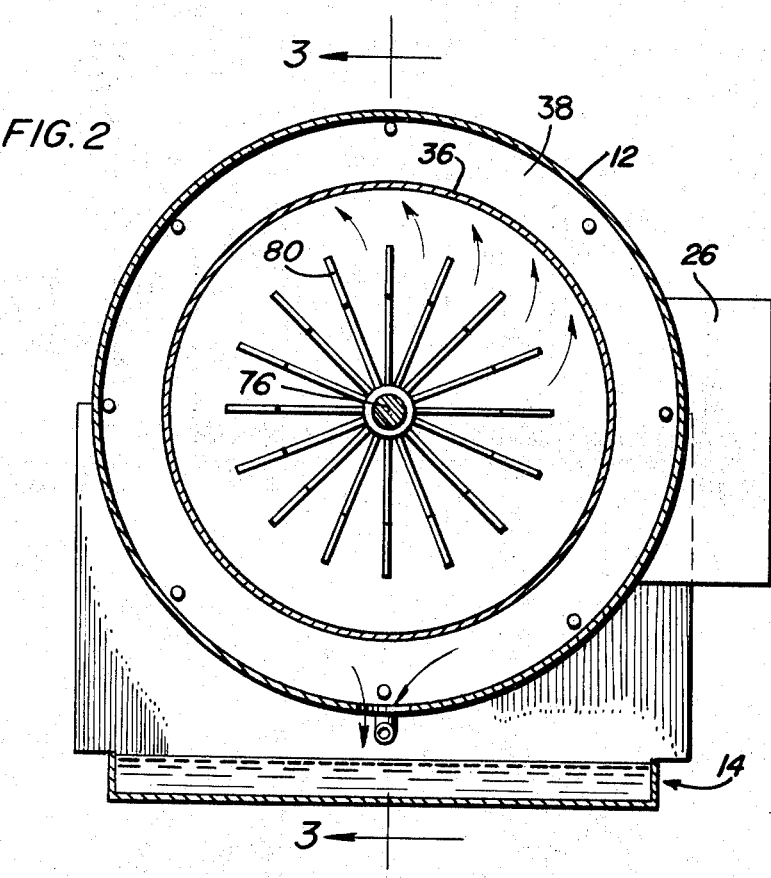
FIG. 2 is a transverse sectional view taken substantially through a plane indicated by section line 2—2 in FIG. 1.

As more clearly seen in FIGS. 2 and 3, the housing 12 includes an outer cylindrical shell 34 and an inner tubular shell 36 forming an annular slurry collection space 38. The outer shell is connected at the bottom to a pair of hollow base portions 40 and 42 adjacent opposite axial ends. The base portions are interconnected by a conduit 44 and are in fluid communication with the annular space 38 for collection of slurry. A slurry is also collected at the bottom of the collection space 39 in the outlet cap section 18 to which conduit 46 is connected for conducting the slurry to the discharge conduit 20 connected to the base portion 40 at the inlet end of the housing.

The inlet section 16 is connected to and supported in coaxial relation to the housing by an end wall 48. Fasteners 50 secure the end wall to the housing at the inlet end while fasteners 52 secure the outlet section 18 to the housing at the opposite axial end. The outlet section includes a tubular portion 54 that extends into the housing in axially overlapping relation to the inner shell 36 having an open axial end 56 that is axially spaced from the outlet end of the housing. A tubular baffle member 58 is coaxially positioned in radially spaced relation between the inner shell 36 and the tubular outlet portion 54 and includes a radial flange portion 60 that is held assembled between the outlet cap section 18 and the outer shell 34 at the outlet end by the fasteners 52.

The inner shell 36 encloses an elongated axial passage that is in fluid communication with the annular collection spaces 38 and 39 at axial end 56. The tubular outlet portion 54 also conducts an outflow from the passage enclosed by the inner shell which is provided with an opening 62 at the bottom intermediate its opposite axial ends to conduct heavier matter into the collection space 38. A venturi flow section 64 is connected to the inner shell intermediate its axial ends to form a convergent passage 66 axially spaced from the inlet section 16 that extends through the end wall 48 and a divergent passage 68 of considerably shorter axial extent. Accordingly, axial inflow to the inner shell from the inlet section is accelerated to a maximum velocity at the throat 70 of the venturi and discharged from the divergent passage at a high velocity relative to the inflow velocity.

A two stage impeller assembly 72 is mounted within the inner shell and includes a drive motor 74 fixedly positioned partially within the convergent passage 66. The power shaft 76 of the motor extends from both axial ends and is connected at one end to impeller blade assembly 78 in close spaced adjacency to the inner end of the inlet section 16. The other end of the power shaft is connected to the second impeller blade assembly 80 in close spaced adjacency to the outlet end of the venturi flow section 64. The blade assemblies 78 and 80 are of a conventional type adapted to receive an axial inflow of fluid and impel the fluid radially outwardly and tangentially. Thus, in response to energization of the motor 74, causing rotation of the impeller blade assemblies, an axial inflow of air will be induced and a vortical flow component imparted thereto. The blade assemblies 78 and 80 extend radially beyond the inlet section 16 and the divergent passage 68 respectively so as to more completely produce vortical flow in two successive stages between which axial flow is accelerated by the venturi flow section 64 to effectively maintain axial movement of the air through the air cleaner.

As a result of the vortical flow imparted to any fluent medium passing through the inner shell 36, the heavier or more dense components thereof will be concentrated adjacent the cylindrical wall surface while the less dense gaseous component of the fluid will occupy the radially inner portion of the flow passage and be discharged from the air cleaner through the outlet portion 54. To augment this centrifugally induced separation action, a liquid such as water is injected into the air cleaner by a spray nozzle 82 located at the inner end of the inlet section. The water particles will become concentrated along the walls of the flow passage with solid particles of dust entrained in the air and mix therewith to form a slurry of even greater density than the water or dry dust particles independently. Also, the water will dissolve many liquid and gaseous contaminants. As the tangential velocity of vortical flow increases with increase in axial flow and successive flow through the two stages of the impeller assembly 72, the slurry forming mixture of water and dust particles increases as well as its concentration accompanied by a corresponding radially inner concentration of the less dense gas or cleaner air that is discharged from the outlet section through portion 54.

The slurry concentrated components of the fluent medium conducted through the housing 12, enter the collection spaces 38 and 39 with a certain amount of baffling so as to release any undissolved gas or air entrained therein. Very heavy components of the fluent material may pass earlier through opening 62 into collection space 38 under gravitational inducement. The slurry collected in spaces 38 and 39 is then conducted away from the air cleaner by conduit 20 for disposal or recycling. If desired or to meet certain requirements, axial flow of dust laden air through the air cleaner may be assisted by auxiliary air moving equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for removing entrained solid particles from a gaseous medium comprising an axially elongated housing having inlet and outlet portions, power operated impeller means mounted within the housing for inducing vortical and axial flow of the gaseous medium between the inlet and outlet portions, venturi passage means mounted within the housing for accelerating axial flow of the gaseous medium through the impeller means, means for injecting a spray of liquid into the gaseous medium entering the venturi passage means, collection means mounted in surrounding relation to the venturi passage means for receiving a mixture of said liquid and solid particles centrifugally separated from the gaseous medium, and baffle means mounted in the housing between the outlet portion and the collection means for enhancing separation of the liquid and solid particles from the gaseous medium exiting from the outlet portion; said impeller means including at least two impeller stages axially spaced upstream and downstream of the venturi passage means, respectively; said venturi passage means including a convergent section having an inlet end extending radially beyond one of the impeller stages, a divergent section having an outlet end radially smaller than the other of the impeller stages and a throat section axially spaced closer to said other of the impeller stages than said one of the impeller stages; and said injecting means being located upstream of said one of the impeller stages.

2. The combination of claim 1 wherein said impeller means further includes a drive motor having a power shaft extending through the venturi passage means and connected to said impeller stages adjacent to the inlet and outlet ends of the venturi passage means.

3. The combination of claim 2 wherein the housing includes an outer shell having opposite axial ends, an end wall connected to one axial end of the shell and supporting the inlet portion, end cap means connected to the other of the axial ends of the shell for supporting the baffle means and the outlet portion, and tubular passage means extending from the end wall toward the outlet portion and internally mounting the venturi passage means in radially spaced relation to the outer shell for conducting said vortical and axial flow of the gaseous medium between the inlet and outlet portions of the housing.

4. The combination of claim 3 wherein said baffle means includes radially spaced tubular sections extending upstream from the outlet portion in axially overlapping relation to the tubular passage means.

5. The combination of claim 4 wherein said collection means comprises a chamber located below the tubular passage means in fluid communication with the annular space between the tubular passage means and the outer shell.

6. The combination of claim 1 wherein the housing includes an outer shell having opposite axial ends, an end wall connected to one axial end of the shell and supporting the inlet portion, end cap means connected to the other of the axial ends of the shell for supporting the baffle means and the outlet portion, and tubular passage means extending from the end wall toward the outlet portion and internally mounting the venturi passage means in radially spaced relation to the outer shell for conducting said vortical and axial flow of the gaseous medium between the inlet and outlet portions of the housing.

7. The combination of claim 6 wherein said baffle means includes radially spaced tubular sections extending upstream from the outlet portion in axially overlapping relation to the tubular passage means.

8. The combination of claim 6 wherein said collection means comprises a chamber located below the tubular passage means in fluid communication with the annular space between the tubular passage means and the outer shell.

* * * * *